United States Patent [19]

Gernet

[11] 4,427,272
[45] Jan. 24, 1984

[54] ANISEIKONIA EYEGLASS LENS WITH PROGRESSIVE MAGNIFICATION

[76] Inventor: Hermann Gernet, Dunanstrasse 6, D-4400 Münster, Fed. Rep. of Germany

[21] Appl. No.: 189,844

[22] PCT Filed: Mar. 27, 1979

[86] PCT No.: PCT/EP79/00023
§ 371 Date: Dec. 4, 1979
§ 102(e) Date: Dec. 4, 1979

[30] Foreign Application Priority Data

Apr. 5, 1978 [DE] Fed. Rep. of Germany ....... 2814678

[51] Int. Cl.³ .................................................. G02C 7/02
[52] U.S. Cl. ..................................... 351/173; 351/169
[58] Field of Search .......................... 351/169, 173, 175

[56] References Cited

U.S. PATENT DOCUMENTS

| | | | |
|---|---|---|---|
| 1,996,086 | 4/1935 | Styll | 351/173 |
| 2,256,587 | 9/1941 | Amas et al. | 351/167 X |
| 2,869,422 | 1/1959 | Cretin-Maitanaz | 351/169 |
| 3,140,338 | 7/1964 | Stollerman | 351/167 |
| 3,950,082 | 4/1976 | Volk | 351/169 |
| 4,055,379 | 10/1977 | Winthrop | 351/169 X |

OTHER PUBLICATIONS

Koetting, R. A. et al, "Progressive Addition Spectacles over Contact Lenses in Aphakia," *American Journal of Optometry and Archives*, vol. 46, No. 6, Jun. 1969, pp. 470–475.

*Primary Examiner*—John K. Corbin
*Assistant Examiner*—Scott J. Sugarman
*Attorney, Agent, or Firm*—Toren, McGeady and Stanger

[57] ABSTRACT

Detailed description in the form of a claim of a novel eyeglass aniseikonia lens with progressive magnification for treating differences in retinal image sizes in cases of unilateral lenslessness or a unilateral artificial lens.

2 Claims, 1 Drawing Figure

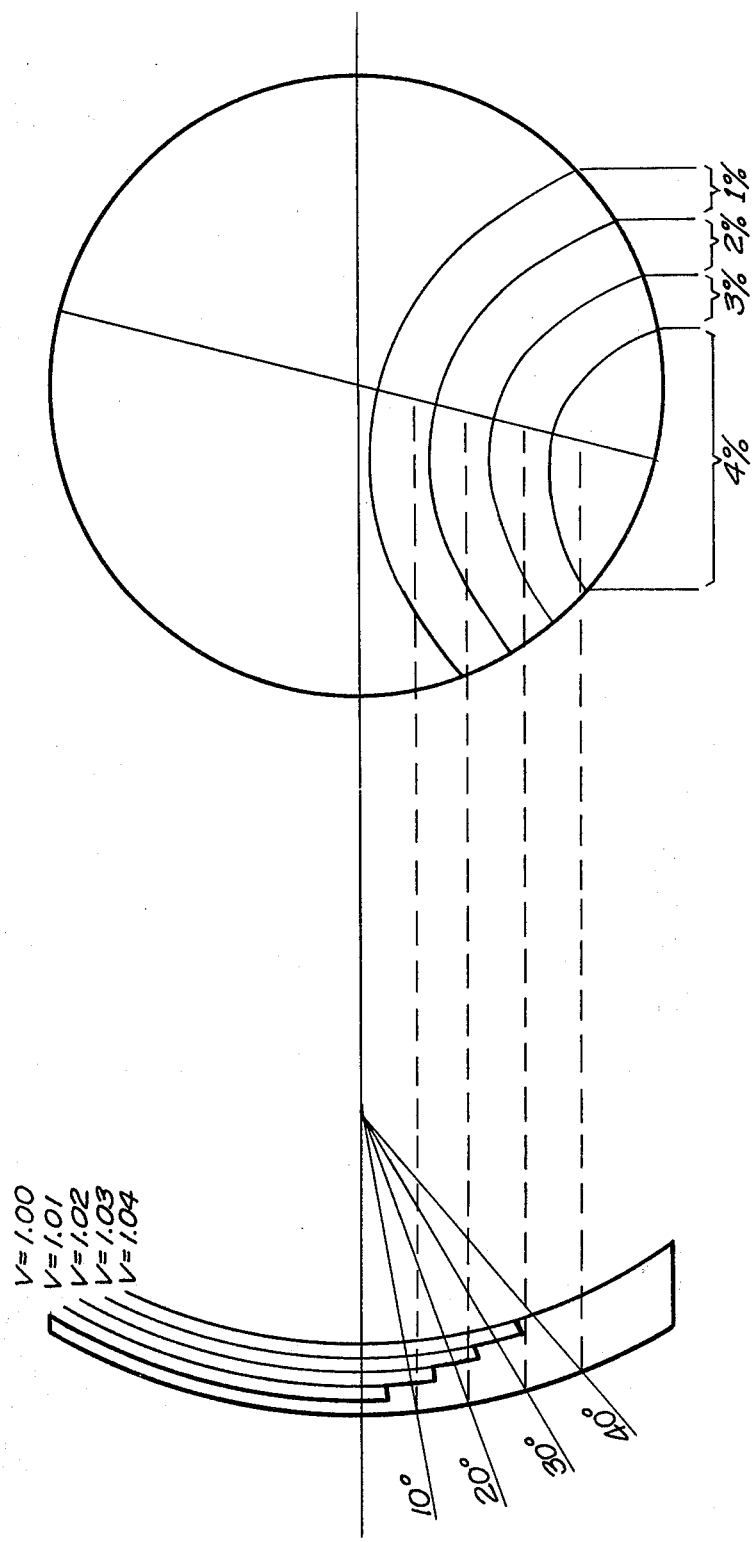

ANISEIKONIA EYEGLASS LENS WITH PROGRESSIVE MAGNIFICATION

TECHNICAL FIELD

The invention relates to a novel eyeglass lens in the form of an aniseikonia lens with progressive magnification which is to be worn in front of the non-operated eye in the case of unilateral lenslessness (aphakia) or a unilateral artificial lens (pseudophakia).

BACKGROUND ART

An aniseikonia lens with progressive magnification without near correction which has the same optical effect for near and far vision (plane lens or spherical and/or cylindrical correction) and, in addition, has a special and progressive image magnification when looking down through the near portion of the lens is not known.

DISCLOSURE OF INVENTION

A novel aniseikonia eyeglass lens with progressive magnification (for the healthy eye) to be worn in the case of unilateral lenslessness (aphakia) or following a unilateral implantation of an artificial lens (pseudophakia), characterized in that, in addition to the conventional equal optical effect for far and near vision (plane lens or spherical and/or cylindrical correction), the lens effects a special and progressive image magnification when looking down through the near portion. Accordingly, this lens is a novel aniseikonia lens with progressive magnification which does not effect the near correction but a continuously increasing image magnification of from 2% to 6% when lowering the line of vision in order to approximately equalize the retinal images in the two eyes of a patient.

Eyeglass lenses having an exclusive or additional image-magnifying effect, or so-called aniseikonia lenses, have heretofore been used, particularly in the cases of unilateral lenslessness or pseudophakia (artificial lens for the eye following a cataract operation), only for far correction or near correction alone or as bifocal lenses.

Those patients which have been successfully operated on the unilateral cataract and do not yet require a near addition or require only a weak near addition for the healthy eye, have significant difficulties with respect to their vision in the near zone when using the conventional eyeglasses, because the differences in the size between the retinal images of the operated and the non-operated eye are too large. The same is true for patients of these age groups having a unilateral artificial lens (pseudophakia). In this case, the image of the operated eye which is corrected by means of a lens becomes too large when compared to the non-operated eye. The inventor was able to prove this fact in numerous scientific papers published during the last six years by means of the "intraocular optics" which the inventor developed and introduced into the clinical ophthalmology.

The present invention of a novel eyeglass lens for the non-operated eye reduces the difference in size by means of a special and novel eyeglass lens which either has no or a conventional optical effect and additionally a special progressive magnification. Accordingly, this lens is a novel aniseikonia lens with progressive magnification with or without an optical effect of the conventional type for near vision and far vision and without an additional near correction which effects a continuously increasing image magnification of from 2% to 6% when the line of vision is lowered, i.e., this lens is an aniseikonia lens of a special type. The continuous image magnification for near vision is effected by a shape of the lens in the near portion which is adjusted to the optical requirements. The thickness in the center and the anterior and posterior curvatures in the near portion of the lens are adjusted to each other in such a manner that the desired progressive image magnification of from 2% to 6% is obtained.

A drawing must be different for each desired lens power. In the following paragraph, an example of a lens having progressive image magnification of from 1% to 4% without additional correction is described with the aid of the drawing representing a front view and a side view of the lens.

BRIEF DESCRIPTION OF DRAWINGS

The drawing illustrates a cross-section and front view of the anisekenia eyeglass lens in accordance with the invention.

DETAILED DESCRIPTION OF THE INVENTION

In this proposal for constructing the lens, the lens is composed of a discrete number of strips of aniseikonia lenses having no refractive power. By way of example, a lens is calculated with a refractive index of $N=1.706$ and an anterior radius of curvature of $R=50$ mm. For a desired magnification V, the following thicknesses T in the middle of the lenses and the following posterior radii of curvature R are required:

| Magnification V | 1.00 | 1.01 | 1.02 | 1.03 | 1.04 | 1.05 |
|---|---|---|---|---|---|---|
| Thickness in the middle of the lens $N:N-1$ $R \times (V-1)$ | 0.00 | 1.21 | 2.42 | 3.62 | 4.83 | 6.04 |
| Radius of Curvature R $V \times R$ | 50.0 | 50.50 | 51.0 | 51.50 | 52.0 | 52.50 |

The required provisions for constructing the lens result from the drawing. For reasons of a clear representation, a large width of the strips has been chosen.

It is possible to provide lenses with smooth surfaces by modifying the above description in the following manner: In the corrugated magnifying portion, the posterior surface is filled with a lens of a lower refractive index whose posterior surface, in turn, may be plane or slightly convex. However, in this case, the curvatures of the joint surface strips must be higher to the extent that the differences in the refractive indices are lower.

BEST MODE OF CARRYING OUT THE INVENTION

The opthalmologist determines the required refraction values of the lens by means of an accurate ultrasonic measurement of the eyes of the patient and suitable calculations in the sense of the intraocular optics. The refraction values of the lenses are sent to the optical company in the form of a prescription either by the optician or initially by the opthalmologist directly. The optical company manufactures these special lenses and delivers them to the optician who mounts the lenses in eyeglass frames and checks the correct insertion of the lenses in the frames. The finished eyeglasses are checked by the opthalmologist.

INDUSTRIAL APPLICABILITY

Patients who had been successfully operated on the unilateral cataract and do not require a near addition or require only a weak near addition, have considerable visual disturbances in the near zone when using the conventional eyeglasses because of the fact that the difference in the size of the retinal images of the operated eye and the nonoperated eye is too large. The same is true for patients of this age group having a unilateral artificial lens (pseudophakia). In this case, the image of the lens-corrected operated eye is too large in comparison to the healthy eye.

The present invention reduces the size difference to compatible values. Cataract operations are the most frequent operations performed in opthalmology. The industrial applicability of the novel aniseikonia lens with progressive magnification concerns patients having a unilateral lenslessness (aphakia) or a unilateral artificial lens (pseudophakia). In the Federal Republic of Germany alone, these are several one hundred thousand patients, in the application countries they amount to several millions.

I claim:

1. An aniseikonia eyeglass lens to be worn in front of the non-operated eye of a patient with unilateral aphakia of pseudophakia, said lens having a portion each for far and near vision having no refractive powers or having refractive powers equal in both said portions, the improvement which comprises a thickness in the center of the lens, a number of strips in said near portion of said lens, said strips having anterior and posterior curvatures for a magnification for near vision which continuously progresses from strip to strip as the patient lowers the line of vision so that the retinal images in the two eyes of the patient are essentially of equal size.

2. Aniseikonia eyeglass lens, as set forth in claim 1, wherein the magnification continuously progresses from 2% to 6%.

* * * * *